United States Patent [19]

Po

[11] Patent Number: 4,922,496

[45] Date of Patent: May 1, 1990

[54] ARMONIC GENERATION IN OPTICAL FIBERS

[75] Inventor: Hong Po, Sherborn, Mass.

[73] Assignee: Polaroid Corporation, Cambridge, Mass.

[21] Appl. No.: 134,016

[22] Filed: Dec. 17, 1987

[51] Int. Cl.$^5$ ............................................... H01S 3/30
[52] U.S. Cl. ........................................ 372/6; 372/22; 372/39; 372/71; 350/96.29
[58] Field of Search ................ 372/6, 10, 18, 12, 22, 372/39, 66, 71; 307/427; 350/96.12, 96.33, 96.29

[56] References Cited

U.S. PATENT DOCUMENTS

| | | | |
|---|---|---|---|
| 3,395,331 | 7/1968 | Snitzer | 372/22 |
| 4,015,217 | 3/1977 | Snitzer | 372/40 |
| 4,680,767 | 7/1987 | Hakimi et al. | 372/6 |

FOREIGN PATENT DOCUMENTS 0175477 9/1985 Japan ...................................... 372/6

OTHER PUBLICATIONS

"Self-organized phase-matched harmonic generation in optical fibers" by R. H. Stolen & H. W. K. Tom, OPTICS LETTERS, vol. 12, No. 8, Aug. 1987.

"Dye laser pumped by Nd:YAG laser pulses frequency doubled in a glass optical fiber" by U. Osterberg & W. Margulis, OPTICS LETTERS, vol. 11, No. 8, Aug. 1986.

"Experimental studies on efficient frequency doubling in glass optical fibers" by U. Osterberg & W. Margulis, OPTICS LETTERS, vol. 12, No. 1, 1/87.

"Second harmonic generation in Ge-doped fibers with a mode-locked Kr+ laser" by B. Valk, E. M. Kim & M. M. Salour, APPLIED PHYSICS LETTERS, 51(10), 9/7/87.

"Second-harmonic generation in a single-mode and multimode fibers", by M. A. Saifi & M. J. Andrejco, Paper No. ThD5, OFC/OFS 88 Conf, 1/25-29/88, New Orleans.

*Primary Examiner*—William L. Sikes
*Assistant Examiner*—B. R. R. Holloway
*Attorney, Agent, or Firm*—Francis J. Caufield

[57] ABSTRACT

Apparatus for providing self-organized, phase-matched harmonic generated radiation which includes a single-mode fiber doped with ytterbium or ytterbium-aluminum which is placed in a laser cavity having a mode-locking and a Q-switching apparatus.

10 Claims, 1 Drawing Sheet

ARMONIC GENERATION IN OPTICAL FIBERS

This patent application hereby incorporates by reference the material contained in the following commonly assigned and co-pending patent applications: (1) a patent application entitled "Optical Fiber Lasers and Amplifiers," Ser. No. 134,357, filed Dec. 17, 1987; (2) a patent application entitled "Method for Fabricating Optical Fibers Having Cores With High Rare Earth Content," Ser. No. 036,505, filed on Apr. 9, 1987; and (3) a patent entitled "Self-Organized, Phase-Matched Second Harmonic Generation In Optical Fibers," Ser. No. 134,014, filed on Dec. 17, 1987.

BACKGROUND OF THE INVENTION

1. Technical Field of the Invention

The present invention pertains to method and apparatus for sum frequency generation in optical fibers and, in particular, to self-organized, phase-matched second harmonic generation in optical fibers.

2. Description of the Prior Art

Much activity has taken place recently in the field of second-harmonic generation in optical fibers in which a photo-induced effect forms a dipole-allowed, second-order susceptibility which is phasematched by the alternation of the sign of the nonlinearity along an optical fiber. For example, such effects have been reported in a paper entitled "Self-Organized Phase-Matched Harmonic Generation in Optical Fibers" by R. H. Stolen and H. W. K. Tom, *Optics Letters*, Vol. 12, No. 8, August, 1987, pp. 585; a paper entitled "Dye Laser Pumped by Nd:YAG Laser Pulses Frequency Doubled In An Optical Fiber," by U. Osterberg and W. Margulis, *Optics Letters*, Vol. 11, 1986, pp. 516; and a paper entitled "Experimental Studies On Efficient Frequency Doubling In Glass Optical Fibers," *Optics Letters*, Vol. 12, 1987, pp. 57. These papers disclose that second harmonic generation may be achieved in germania-phosphorus doped silica fibers after several hours of illumination from a Q-switched, mode-locked Nd:YAG laser having pulses with peak intensities of radiation of 100–200 $GW/cm^2$. In effect, the fiber became a self-organized second harmonic generator.

The paper by Stolen and Tom discloses that the production of, or the conditioning of, the fiber to produce second harmonic radiation could be shortened substantially from many hours to several minutes by simultaneously illuminating the fiber with radiation at 0.532 um and radiation at 1.064 um. In fact, Stolen and Tom report that they produced the second-harmonic nonlinearity in a fiber in about five minutes as compared to the tens of hours required without the "seeding" provided by the 0.532 um harmonic radiation.

The above-cited papers disclose that the authors achieved the self-organized second harmonic generation in a single-mode germanium doped fused silica fiber having a 0.2 wt % co-doping of phosphorus. In fact, the above-cited papers consider the phosphorus to be essential to the production of the second harmonic generation. Additionally, they consider that the only effect the germanium doping has is to appropriately modify the index of refraction of the core to a value which is necessary to develop an appropriate NA (numerical aperture) for introducing radiation into the single-mode core.

However, several recent papers have disclosed that self-organized second harmonic generation can be obtained in germanium doped fibers. Such disclosures occurred in a paper entitled "Second-Harmonic Generation in Ge-Doped Fibers With a Mode-Locked Kr+ Laser" by B. Valk, E. M. Kim and M. M. Salour *Appl. Phys. Let.*, Vol. 51, No. 10, Sept. 7, 1987, p. 722 and an abstract entitled "Second-Harmonic Generation in Single-Mode and Multimode Fibers" by M. A. Saifi and M. J. Andrejco, *Paper No. ThD5, OFC/OFS 88 Conference (Optical Fiber Communications/Optical Fiber Sensors)*, January 25–29, 1988, New Orleans.

SUMMARY OF THE INVENTION

An embodiment of the present invention comprises a single-mode, ytterbium-aluminum doped, fused silica core of an optical fiber disposed in a laser cavity comprising a first and a second reflector. The apparatus further comprises means for mode-locking and means for Q-switching the laser output from the ytterbium-aluminum doped core. In this embodiment, the fiber is end pumped with radiation in the absorption band of ytterbium through one of the cavity reflectors, for example the pumping radiation having wavelengths substantially in the gauge of 0.84 um to 1.06 um and preferably having wavelengths around 0.920 um or 0.970 um.

In operation, the ytterbium-aluminum doped core lases at 1.06 um or at 1.02 um, depending upon the reflectivities of the cavity reflectors. The mode-locking means and Q-switching means combine to provide high intensity radiation which propagates in the core of the fiber. As a result, the core is conditioned and it becomes "self-organized" to produce second harmonic radiation. Because ytterbium does not absorb radiation substantially at 0.532 um or 0.51 um, the laser source itself can be self-organized. In a preferred embodiment, the optical fiber is self-organized before its insertion into the laser cavity.

BRIEF DESCRIPTION OF THE DRAWING

The principles of the present invention may be clearly understood by considering the following detailed description in conjunction with the accompanying drawing, in which.

DETAILED DESCRIPTION

Figure 1:
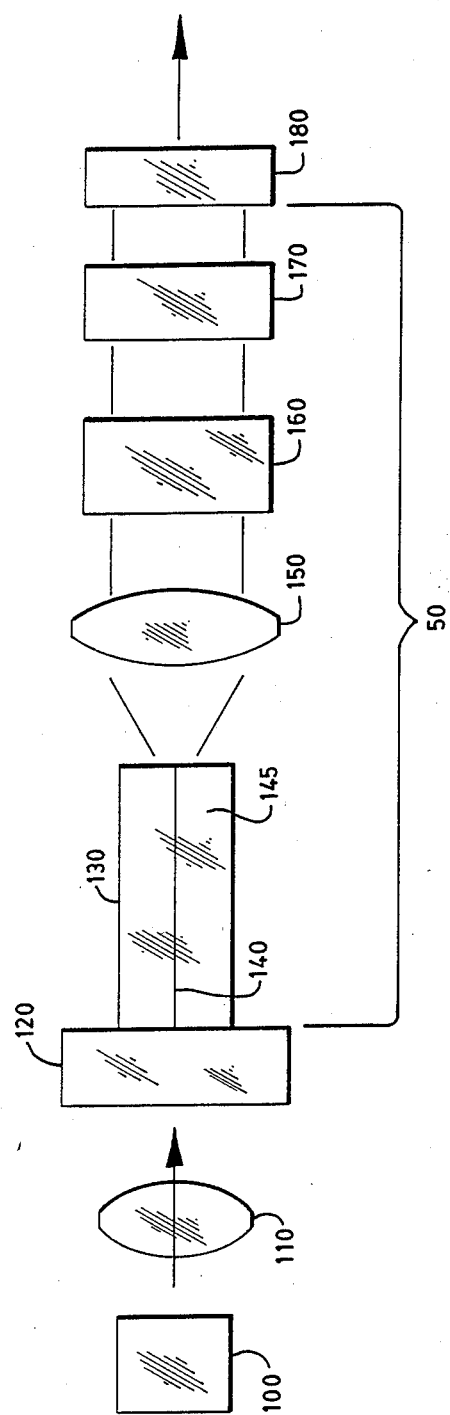
FIG. 1 shows, in pictorial form, a preferred embodiment of the present invention for providing second harmonic generation in an ytterbium-aluminum-doped, single-mode fiber.

FIG. 1 shows a preferred embodiment of the present invention. Laser source 100 outputs laser radiation in the absorption band of ytterbium at wavelengths, for example, substantially in the range of 0.84 um to 1.06 um and preferably around 0.920 um or 0.970 um. The laser radiation output from laser source 100 is focused by focusing means 110, for example, a microscope objective, through dichroic filter 120 onto one end of fiber 130. Fiber 130 comprises an ytterbium-aluminum doped, fused silica, single-mode core 140. Core 140 is placed in an eccentric disposition relative to a cladding or in a slab waveguide cladding to provide efficient coupling of the radiation from laser source 100 thereinto, both of which configurations are fabricated in accordance with an invention disclosed in a patent application entitled "Optical Fiber Lasers and Amplifiers" which is co-assigned with the present application, whose Ser. No. 134,357 and whose filing date is Dec. 17, 1987, and which patent application is incorporated herein by reference. Radiation which emerges from core 140 is focused by focusing means 150 onto mode-locking means 160. Mode-locking means 160 may be any one of a number of means for providing mode-locking which are known in the art, such as, for example, electro-acoustical mode-locking means. The radiation emerging from mode-locking means 160 passes through Q-switching means 170. Q-switching means 170 may be any one of a number of means for providing Q-switching which are known in the art, such as, for example, electro-acoustical Q-switching means. The radiation emerging from Q-switching means 170 impinges on dichroic filter 180.

Dichroic filters 120 and 180 are designed to provide laser cavity 50 for fiber 130. The wavelength of transmission of dichroic filters 120 and 180 depends upon the wavelength of the desired laser output. For example, in order to provide laser output at 1.02 um, in one embodiment, dichroic filter 120 should transmit a substantial portion of laser radiation from laser source 100 at wavelengths around 0.920 um or 0.970 um and should be highly reflective at 1.02 um. For example, dichroic filter 120 should have a reflectivity of >99% at 1.02 um and dichroic filter 180 should also be highly reflective at 1.02 um, for example, having a reflectivity of >99%. The reflectivity of dichroic reflector 180 can be so high at 1.02 um since we are only interested in obtaining output at the second harmonic wavelength. If one desires laser output from fiber 130 substantially at 1.06 um, then the reflectivities of dichroic reflectors 120 and 180 are adjusted to be >99% and >99%, respectively, at 1.06 um.

As is well-known in the art, the use of mode-locking means 160 and Q-switching means 170 in laser cavity 50 formed by dichroic reflectors 120 and 180 substantially increases the peak power intensity of the laser pulses in cavity 50. These high intensity pulses traverse single-mode core 140 of fiber 130 and cause the core to become "self-organized." Core 140 is preferably a single-mode core in order to provide the high intensities that are preferred in producing the "self-organizing" effect because the "self-organizing" conversion efficiency is proportional to the square of the intensity of the pump radiation.

In accordance with the present invention, the laser radiation produced in fiber 130 at wavelengths such as 1.02 um or 1.06 um, produces, in turn, second harmonic radiation substantially at 0.51 um or substantially at 0.532 um, respectively. Such second harmonic radiation can be extracted from laser cavity 50 by adjusting the transmissivity of, for example, dichroic reflector 180, to be high at the wavelength of the second harmonic radiation. Further, the second harmonic radiation may be extracted from laser cavity 50 by other means well known in the art, such as by use of beam splitters.

The advantage of the apparatus disclosed in FIG. 1 is that the second harmonic radiation is not absorbed by the materials comprising core 140. For that reason, we have been able to "self-organize" the laser source of radiation.

Fiber 130 is fabricated in accordance with methods well-known in the art, for example, by a modified chemical vapor deposition (MCVD) process to form an ytterbium-aluminum doped, fused silica ($SiO_2$), single-mode core 140 within cladding 145. The doping concentration of ytterbium in core 140 may range from 0.1 to 1.5 wt. %, 1.0 wt. % being preferred and the doping concentration of aluminum in core 140 may range from 0.5 wt. % to 5.0 wt. %, 3.0 wt. % being preferred. Cladding 145 is designed to provide a large enough numerical aperture (NA) so that a large amount of radiation from laser source 100 is coupled into core 140. Further, such large concentrations of ytterbium are fabricated in accordance with an invention disclosed in a patent application entitled "Method For Fabricating Optical Fibers Having Cores With High Rare Earth Content," Ser. No. 036,505, filed on Apr. 9, 1987, commonly assigned with this application, and which is incorporated by reference herein.

The length of fiber 130 is so chosen to give maximum gain commensurate with the available pump power from the laser source 100.

In a preferred embodiment of the present invention, before single-mode fiber 130 is inserted into laser cavity 50, it is "self-organized" in accordance with an invention disclosed in a patent application entitled "Self-Organized, Phase-Matched Second Harmonic Generation In Optical Fibers" which is co-assigned with the present application, whose Ser. No. is 134,014 and whose filing date is Dec. 17, 1987, and which patent application is incorporated herein by reference. Even though this step of "pre-self-organization" may be carried out with a Nd:YAG laser having output at 1.06 um, this step will still provide an improvement in the embodiment when seeking second harmonic generation at 1.02 um.

Although particular embodiments of the present invention have been shown and described herein, many varied embodiments incorporating the teachings of the present invention may be easily constructed by those skilled in the art. For example, "self-organization" by the interaction of light with matter in the apparatus shown in FIG. 1 is expected to be obtained where core 140 is doped with $Yb^{3+}$ ions as well as $Yb^{2+}$ ions, $Tb^{3+}$ ions, $Tb^{4+}$ ions, $Ce^{3+}$ ions, or $Ce^{4+}$ ions.

What is claimed is:

1. Apparatus for providing second harmonic generated radiation which comprises:
   an optical fiber disposed in a laser cavity, the optical fiber having a substantially single-mode core which is doped with an active laser material, the laser material being self-organizable to produce radiation by second harmonic generation, the laser material further being substantially transparent to the second harmonic generated radiation; and
   means for pumping the core of the optical fiber to produce laser radiation therein and said laser cavity further comprising means for extracting at least a portion of the second harmonic generated radiation.

2. The apparatus of claim 1 which further comprises means for mode-locking the laser radiation output from the core of the optical fiber and means for Q-switching the laser radiation output from the optical fiber.

3. The apparatus of claim 2 wherein the core comprises a fused silica core and the laser material is selected from the group consisting of $Yb^{3+}$, $Yb^{2+}$, $Tb^{3+}$, $Tb^{4+}$, $Ce^{3+}$, $Ce^{4+}$, and ytterbium-aluminum.

4. The apparatus of claim 3 wherein the optical fiber further comprises a multi-mode cladding surrounding the single-mode core and a further cladding surrounding the multi-mode cladding, and the single-mode core is disposed at an offset from the geometric center of the multi-mode cladding.

5. The apparatus of claim 3 wherein the optical fiber further comprises a multi-mode cladding surrounding the single-mode core and a further cladding surrounding the multi-mode cladding, and the length of the cross-sectional area of the multi-mode cladding is substantially different from the width.

6. The apparatus of claim 5 wherein the laser cavity comprises a first dichroic reflector disposed before one end of the fiber and a second dichroic reflector disposed after the other end of the fiber, and wherein at least one of said reflectors is at least partially transparent to the second harmonic generated radiation to provide the means for extracting at least a portion of the second harmonic generated radiation.

7. The apparatus of claim 2 wherein the mode-locking means and the Q-switching means are electro-acoustical means.

8. Method for providing second harmonic generated radiation which comprises the steps of:

placing an optical fiber in a laser cavity, the optical fiber having a substantially single-mode core which is doped with an active laser material, the laser material being self-organizable to produce radiation by second harmonic generation, the laser material further being substantially transparent to the second harmonic generated radiation, and said laser cavity further comprising means for extracting at least a portion of the second harmonic generated radiation; and pumping the core of the optical fiber to produce laser radiation therein.

9. The method of claim 8 wherein the core comprises a fused silica core and the laser material is selected from the group consisting of $Yb^{3+}$, $Yb^{2+}$, $Tb^{3+}$, $Tb^{4+}$, $Ce^{3+}$, $Ce^{4+}$, and ytterbium-aluminum.

10. The method of claim 8 which further comprises the steps of mode-locking and Q-switching laser radiation output from the optical fiber.

* * * * *